US008565176B2

(12) United States Patent
Norlén et al.

(10) Patent No.: US 8,565,176 B2
(45) Date of Patent: Oct. 22, 2013

(54) WIRELESS NETWORK

(75) Inventors: Niclas Norlén, Uddevalla (SE); Per Hulthén, Göteborg (SE)

(73) Assignee: LumenRadio AB, Göteborg (SE)

( * ) Notice: Subject to any disclaimer, the term of this patent is extended or adjusted under 35 U.S.C. 154(b) by 149 days.

(21) Appl. No.: 13/254,842

(22) PCT Filed: Mar. 3, 2010

(86) PCT No.: PCT/EP2010/001309
§ 371 (c)(1),
(2), (4) Date: Sep. 3, 2011

(87) PCT Pub. No.: WO2010/099943
PCT Pub. Date: Sep. 10, 2010

(65) Prior Publication Data
US 2012/0002627 A1    Jan. 5, 2012

Related U.S. Application Data

(60) Provisional application No. 61/157,264, filed on Mar. 4, 2009.

(30) Foreign Application Priority Data

Mar. 4, 2009 (SE) ..................... 0900278

(51) Int. Cl.
H04W 4/00 (2009.01)
H04L 12/28 (2006.01)
H04L 12/56 (2011.01)
(52) U.S. Cl.
USPC ......................................... 370/329; 370/252
(58) Field of Classification Search
USPC ........................................ 370/252, 328, 329
See application file for complete search history.

(56) References Cited

U.S. PATENT DOCUMENTS

| 4,521,881 A | * | 6/1985 | Stapleford et al. | 370/488 |
| 6,278,723 B1 | | 8/2001 | Meihofer et al. | |
| 2003/0147655 A1 | * | 8/2003 | Shattil | 398/182 |
| 2010/0067435 A1 | * | 3/2010 | Balachandran et al. | 370/328 |

FOREIGN PATENT DOCUMENTS

WO    2008007375 A2    1/2008

OTHER PUBLICATIONS

"Cluster-based multi-channel scheduling algorithms for ad hoc networks", Hyukjin Lee et al., Wireless and Optical Communications Networks, 2007, WOCN '07. IFIP International Conference on, pp. 1-5, Jul. 2-4, 2007.
"CogMesh: A Cluster-based Cognitive Radio Network", by Tao Chen et al., New Frontiers in Dynamic Spectrum Access Networks, 2007. DySPAN 2007, 2nd IEEE International Symposium on, pp. 168-178, Apr. 17-20, 2007.

* cited by examiner

*Primary Examiner* — Ronald Abelson
(74) *Attorney, Agent, or Firm* — Capitol City TechLaw

(57) ABSTRACT

The present invention relates to a wireless network 30; 60 including at least two subnets 31-34; 61-63. Each subnet comprises a plurality of units 21, 22 configured to wirelessly communicate with each other. The wireless network is configured to select a local set of communication parameters CP1, CP3 for internal communication within each subnet in such a way that internal communication within neighboring subnets uses different local sets of communication parameters to prevent interference between neighboring subnets, and to select at least one common set of communication parameters CP2 for each subnet to be used when communicating between subnets in the wireless network 30; 60. The invention also relates to a method for adapting a wireless network, a method for forming a wireless network and a communication unit.

6 Claims, 6 Drawing Sheets

WIRELESS NETWORK

CROSS REFERENCE TO RELATED APPLICATIONS

This application claims the benefit under 35 USC 119(e) to U.S. Provisional Patent Application No. 61/157,264 filed on Mar. 4, 2009.

TECHNICAL FIELD

The present invention relates to a wireless network having a plurality of subnets, especially configured to adapt to a wireless environment.

BACKGROUND

The task to create networks covering large areas and spanning over vast distances, in environments where many wireless networks are simultaneously operating, have always been a challenge. Such environments are typically found in urban and industrial areas. In addition to the challenge to cover large areas, interference from other wireless devices will vary from one location to another. For instance, WiFi may be extensively used at one location in the network and thereby occupying a large portion of the available frequencies, and different frequencies may be occupied elsewhere in the network.

Furthermore, interference will vary over time due to the fact that some wireless networks are used more at certain hours of the day, and others new wireless networks may also be installed. An example of this is WiFi usage in a residential area which is often used more heavily during the evenings and weekends.

Traditional prior art techniques are well suited for small area networks such as a WiFi hotspot; a Bluetooth voice transfer from a headset to a mobile phone; and a wireless metering network. The prior art technique for interference free coverage in large area networks is to only allow signals within a frequency range for a specific wireless network, which often requires a governmental license. Examples of such networks are GSM and television broadcasting, see for instance EN 301 511, Global System for Mobile communications (GSM).

If a network is expanded to cover a large area where a number of WiFi networks and other wireless networks are operating, the problem with interference arises. The use of the same communication parameters, such as frequency, in the different networks may result in disrupted communication. Although the WiFi hotspots are out of range of each other, they are within the coverage area of the expanded large area network. It should be noted that not only the expanded large area network may be disrupted due to the interference between the networks, but most certainly the local WiFi networks will be disrupted resulting in a lower quality of service for the WiFi hotspots.

A typical example is a multi-storey office building having a WiFi network on each and every floor. Sometimes many local WiFi areas may be found on the same floor. The sum of all frequencies used within the entire building, which may be considered to be a large area network, results in a loss of available frequencies to use. This may result in communication drop outs. In addition to this, other wireless more mobile devices, such as wireless head sets, may be frequently used within the multi-storey building further increasing the density temporarily.

Reference [1] discloses a network divided into a number of clusters (subnets) that communicates internally using a local set of communication parameters. The cluster heads also may exchange communication between the clusters using a set of communication parameters. The communication is performed over a number of frequency channels divided into time slots. The intra-communication (within the clusters) and the inter-communication (between clusters) is performed sequential using the same frequency channels in different time slots.

Reference [2] discloses a network configured to adapt to a wireless environment, by allocating available resources.

SUMMARY OF THE INVENTION

An object with the present invention is to provide a wireless network that reduces the risk of interference from other wireless networks with a maintained or increased throughput compared to prior art networks.

This object is achieved by a wireless network having a plurality of subnets. The subnets are configured to transport data within each subnet and between subnets in the network, and each subnet within the network will operate independently of other subnets. Each subnet is configured to use a local set of communication parameters for internal communication that is unique for neighboring subnets, and neighbouring subnets are also configured to communicate with each other using a common set of communication parameters. The internal communication and communication between the subnets may be performed simultaneous.

An advantage with the present invention is that interference from wireless networks present in the coverage area of the wireless network may be reduced by selecting local and common communication parameters.

Another advantage with the present invention is that the coverage area of the wireless network may be expanded compared to prior art networks.

Further objects and advantages may be found by a skilled person in the art from the detailed description.

BRIEF DESCRIPTION OF DRAWINGS

The invention will be described in connection with the following drawings that are provided as non-limited examples, in which.

DETAILED DESCRIPTION

Figure 1:
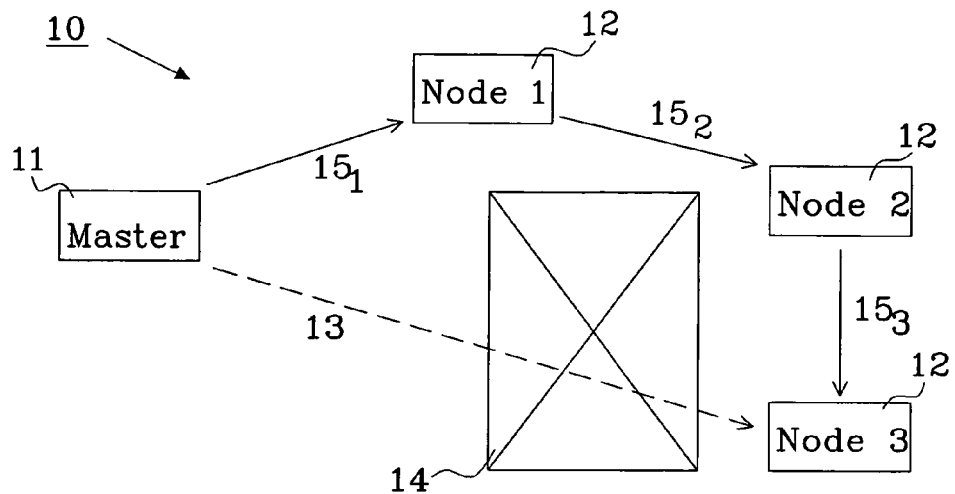
FIG. 1 shows a wireless network using mesh communication according to prior art.

Communication between two units in a network is initiated by a master, and the target for the communication is defined as a node. Communication is performed in full duplex, half duplex or alternatively in simplex mode.

In full duplex mode, communication can be established simultaneously in both directions between the master and the node, as is common in telecommunication applications. In half duplex mode, communication can be established in both directions between the master and the node but only in one direction at a time, as is common for communication radio applications. Full duplex communication will have up to twice the transfer rate as half duplex communication.

In simplex mode, communication may only be established in one direction between the master and the node, as is common in radio and television broadcast applications. Simplex may have the same transfer rate as full duplex but only in one direction.

The master and node transmissions make use of specific communication parameters in order to transport data in the most efficient way.

The communication parameters may include: frequency, transmission rate, transaction timing, transmission power level and data transport path, data transport algorithm, spreading technique, carrier modulation, and other parameters related to quality estimation.

The most frequently used communication parameters are explained in more detail below:
- The frequency needs to be exactly the same for both master and node.
- Transmission rate is a measure of how fast data is sent.
- Transaction timing is defining when a transmission of a data packet starts and how often data packets are sent. Transmission rate and the transaction timing will determine the true data bandwidth.
- The transmitting unit (master or node) will transmit a data packet at a certain power level. A rule of thumb is the higher power the longer transmission distance.
- The data transport path quality is a measure needed to determine and use the best and most reliable path for data transport.

A master will only transmit when the node is in receiving state. In half duplex and full duplex mode the node will only transmit to the master when the master is in receiving state.

For instance, communication may be performed in a sequence of timeslots, and the communication for each timeslot is performed on a particular frequency known to both master and node. On a following timeslot another frequency is used. A limited number of frequencies are used but the same frequency is never used in two adjacent timeslots. Those frequencies will be forming a list of frequencies which is commonly known as a frequency key. The frequency key is known to both master and nodes in advance. This technique is commonly known as frequency hopping spread spectrum. Furthermore, a particular frequency in a timeslot used for communication is commonly called a communication channel, as disclosed in reference [1].

The most basic form of data transaction is between a master and a node is called point to point communication. A data packet may also be broadcasted from a master to many nodes at the same time which is called point to multipoint. A more advanced form of communication is when a data transaction is made from a master to a node by relaying the packet using other wireless devices. This communication topology is commonly known as mesh communication.

Mesh communication is typically used when a node is not within range of a master for example when a solid object is degrading the signal, as illustrated in FIG. 1.

FIG. 1 shows a wireless network 10 using mesh communication comprising a master 11 and a number of nodes 12. The master 11 wants to establish communication with a particular node, denoted Node 3, but point-to-point communication, as illustrated by the dashed arrow 13, is not possible since the path is blocked by a building 14. Therefore, the master 11 establishes communication with Node 3 through several other nodes, denoted Node 1 and Node 2, which acts as relays between the master and Node 3, as indicated by the arrows $15_1$, $15_2$ and $15_3$.

Figure 2:
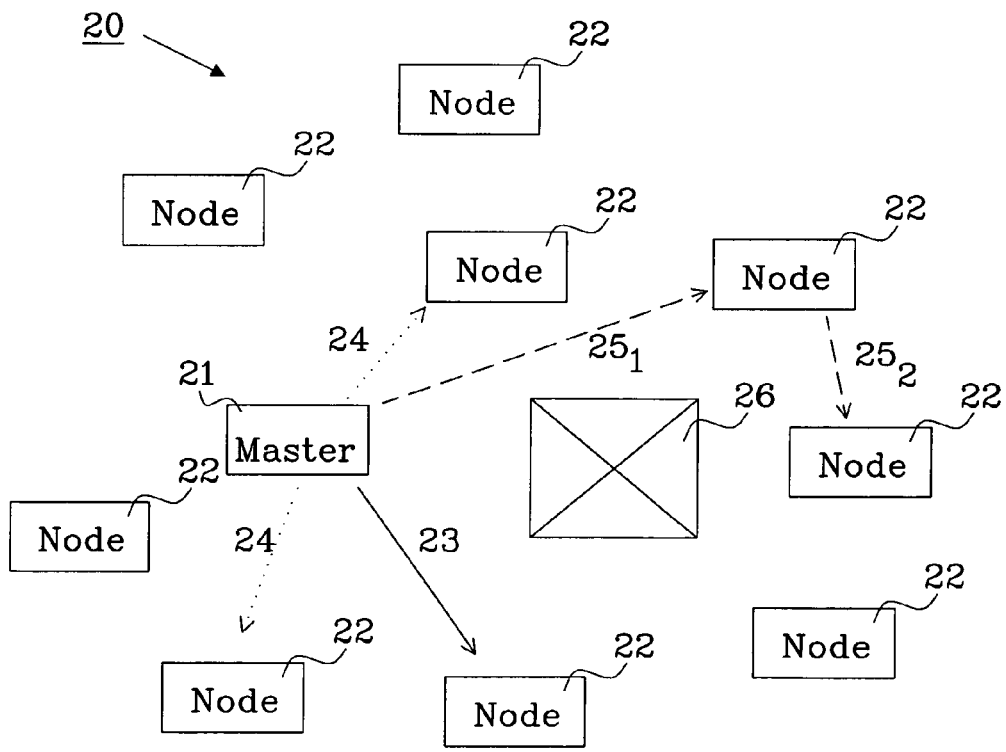
FIG. 2 shows a local network according to prior art.

A wireless network is formed by a minimum of two units a master and a node but may contain several nodes in larger networks, as illustrated in FIG. 1. However, some nodes may be passive while communication is performed elsewhere in the network, as illustrated in FIG. 2. The forms of communication may be point-to-point, point-to-multipoint or mesh using simplex, or half duplex, or full duplex transactions.

FIG. 2 shows a local network 20, also called subnet, comprising a master 21 and a plurality of nodes 22. An object 26 is present to exemplify the forms of communication. Point-to-point communication is illustrated by the continuous arrow 23, point-to-multipoint communication is illustrated by dotted arrows 24, and mesh communication is illustrated by dashed arrows $25_1$ and $25_2$ to a node positioned behind the object 26.

It should be noted that all communications could be initiated by the master 21 in the subnet 20, as illustrated, but it is also possible that the nodes 22 in the subnet 20 are configured to initiate communication within the subnet 20. This could be done by appointing a node that initiates communication to be a "temporary master". When the communication task is performed the node resigns as temporary master.

The general concept of the present invention is to form a wireless network comprising a plurality of local networks, such as described in connection with FIG. 2, and to use unique communication parameters within each local network while still being able to communicate with neighbouring local networks. As explained above, these local networks within the wireless network are called subnets.

Subnets within a wireless network may communicate and exchange data in a similar way as the master-node communication described in connection with FIGS. 1 and 2. The main difference is that any subnet may initiate communication with another subnet, compared to internal communication within a subnet that is initiated by the master. The subnet initiating communication will become an initiating subnet. Half duplex and simplex are preferably used to exchange data from one subnet to another.

A wireless network is always formed from two or more subnets. The subnets within the wireless network may form a mesh network meaning that two subnets not within range of each other may exchange data through other subnets, as illustrated in FIG. 3.

Figure 3:
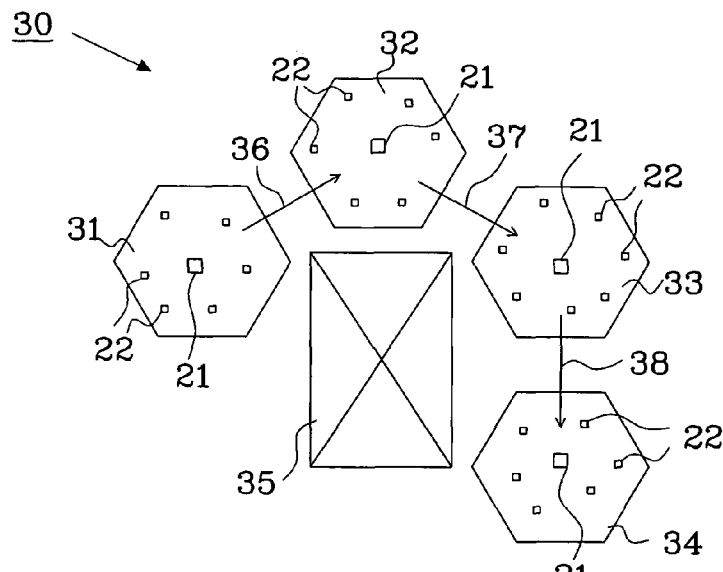
FIG. 3 shows a first embodiment of a wireless network including a plurality of local networks according to the present invention.

FIG. 3 shows a first embodiment of a wireless network 30 having a plurality of subnets 31-34 arranged around a building 35. Each subnet is provided with a master 21 and at least one node 22, as illustrated in connection with FIG. 2, and is configured to use a local set of communication parameters for internal communication. Neighbouring subnets, such as subnets 31 and 32, are also configured to communicate with each other using a common set of communication parameters. If a data packet is intended to be transferred from subnet 31 to subnet 34, subnet 31 will become an initiating subnet and subnet 34 will become a target subnet. Each arrow 36, 37 and 38 illustrates communication channels between the subnets.

Data transaction between subnets may only be allowed at certain times when there is no communication within the subnets, but preferably data transactions between subnets may be performed simultaneously with internal communication within the subnets. Communication between subnets is formed in such a way that a node, or master, in the initiating subnet will initiate transmission of a data packet when a node, or master, in the subnet intended to receive the data packet is in receiving mode. In half duplex communication the node, or the master, in the subnet will transmit data when the node, or the master, in the initiating subnet is in receiving mode. The communication is preferably, but not necessarily, performed in unique timeslots. Communication parameters used for each communication channels, i.e. subnet to subnet communication, are formed as the union of the parameters of each of the two subnets, i.e. communication parameters that are common for the two subnets.

EXAMPLE

Two subnets, subnet 31 and subnet 32, shall communicate.

Each neighboring subnet uses a unique set of communication parameters for internal subnet communication. Subnet 31 uses communication parameters A, B, C and subnet 32 uses communication parameter C, D, E. The communication between subnet 31 and 32 is performed using the union of both which is parameter C, i.e. the common communication parameter. In this example, communication parameters A-E may be exemplified as five different frequency ranges, wherein the common frequency range "C" illustrate a common communication channel in the frequency domain being shared by subnet 31 and 32. The frequency ranges "A" and "B" illustrate two communication channels in the frequency domain available for internal communication in subnet 31, and the frequency ranges "D" and "E" illustrate two communication channels in the frequency domain available for internal communication in subnet 32.

A subnet that is a part of a wireless network preferably has at least two sets of communication parameters, i.e. one for internal communication (local set of communication parameters) and one for communication between the subnet and a neighboring subnet. If the subnet has several neighboring subnets, an extra set of communication parameters may be needed for every other subnet it is configured to communicate with unless all neighboring subnets share a common set of communication parameters, such as a common frequency range.

Systems including wireless networks may coexist within a subnet such as mobile telephony networks, Wi-Fi hotspots for wireless internet access, wireless sensor networks and many more. All those coexisting networks will occupy one or several frequencies. For instance, Wi-Fi hotspots and wireless sensor may share and use the same frequencies as the subnet. The wireless networks operating on the same frequencies would randomly collide resulting, in best case, in a degradation of the transmission rate and, in worst case, in a completely blocked communication. In order to prevent this from happening, a method to increase the coexistence performance is described below.

The coverage area of each subnet is formed from parameters such as:
1. The overall wireless communication density in the area.
2. Local data transaction density (data transaction may be more dense between certain units locally).
3. Maximum number of nodes allowed communicating with a master.
4. Communication range between the master and nodes.

All of these parameters will influence and alter the so called local wireless environment. The prioritization when a subnet is formed is made in this order because the overall aim for the method described is to maximize coexistence performance with other wireless networks.

1. Overall Wireless Communication Density

For example, in dense urban areas where the density of Wi-Fi hotspots is likely to be high, the size of the subnets will be smaller compared to what would be the case in less populated areas. For each neighboring subnet, a unique local set of communication parameters will be formed, such as those mentioned above and therefore adapt to the current wireless environment.

2. Local Data Transaction Density

Typically at some locations in the wireless network, communication between a master and a node in a subnet may be more intense. An example of this is a node that transmits audio data, or a wireless camera transmitting live video images, to a master continuously. Naturally a large amount of data will be transmitted during the time of transfer. This example demonstrates a high local data transaction density within the wireless network.

3. Number of Nodes

The number of nodes, i.e. communication units, in a subnet may be increased or decreased depending on local changes in the wireless environment by mapping every node to a wireless environment profile available from the master. The basic concept is that if a node experiences a wireless environment different from the wireless environment profile stored by the master, a decision is taken to either let the node form a new subnet or to join a neighboring subnet with a profile that has a better match.

4. Communication Range

A master may communicate with a node arranged outside the coverage area of the master via one or more nodes, as illustrated in FIG. 2, with the drawback of introducing delay when transmitting and receiving signals. The communication range will be limited to the maximum acceptable delay that intervening nodes will cause.

Figure 4:
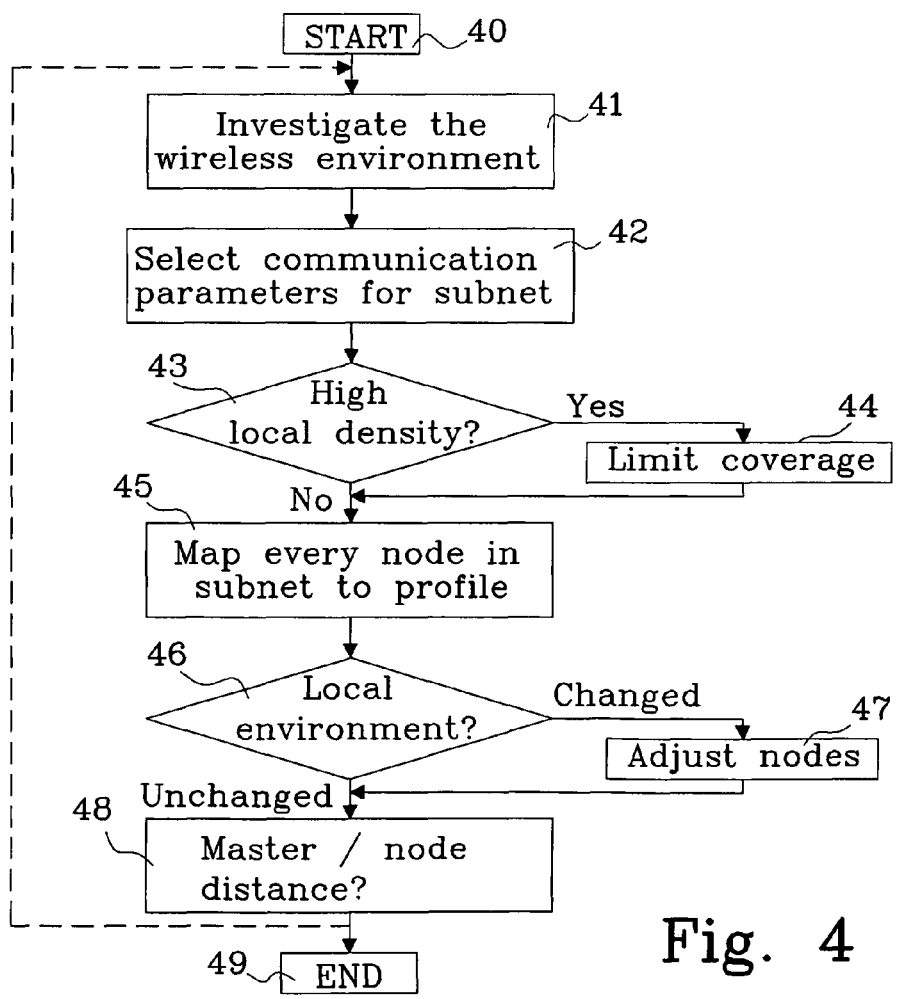
FIG. 4 shows a flow chart illustrating the process to determine the coverage area of a subnet.

FIG. 4 shows a flow chart illustrating the process to adapt the coverage area of the subnet.

The flow starts in step 40 and the wireless environment of the master in the subnet is investigated in step 41 to determine the wireless environmental profile of the master by listening and identifying communication parameters (CPs) used in other wireless applications, networks, etc. In step 42 a local set of CPs is selected for the subnet, with unique local set of CPs for neighboring subnets, based on the wireless environmental profile of the master.

In step 43, the presence of any high local density, i.e. any high local data transaction application, is investigated. If an application that causes a high local density is present, as exemplified above, the flow continues to step 44 in which the coverage area of the subnet is limited by reducing the number of nodes that could communicate with the master, and then to step 45. However, if no high local density is found the flow continues directly to step 45.

The local environment of every node present in the subnet is investigated and mapped against the wireless environmental profile of the master in step 45, and in step 46 a decision is made to determine appropriate action for local environment changes for every node in the subnet. If the local environment of a node is changed, the flow continues to step 47 and the subnet affiliation of the node is changed by either forming a new subnet or joining another subnet, as disclosed in more detail in connection with FIG. 9. The flow thereafter continues to step 48. However, if the local environment of a node is unchanged, the flow continues directly to step 48.

In step 48, the effect of communication delays in the subnet is investigated and if the distance is too great, i.e. the delay when transmitting and/or receiving signals between the master and a node in the subnet is higher than a maximum acceptable delay, the subnet affiliation of that node is changed.

The flow ends at step 49. It should be noted that the flow chart discloses a process that is executed, for instance, at start up of a wireless network, but the process is preferably executed at regular intervals, as indicated by the dashed feedback line in FIG. 4.

Figure 5:
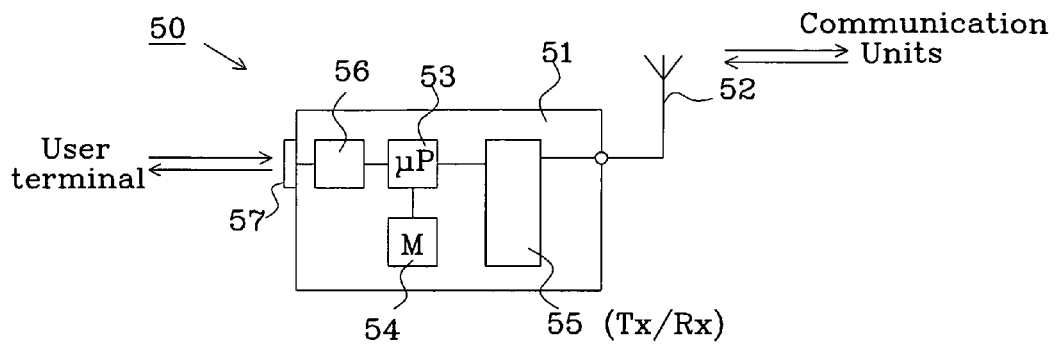
FIG. 5 shows a communication unit according to the invention, including the necessary features to act as gateway in a master or a node.

FIG. 5 shows a communication unit 50, such as a master or a node that could be used in a wireless network according to the invention. The communication unit comprises a module 51 configured to communicate with other units (within the same subnet or other subnets) via an antenna 52. The module comprises a processor 53 connected to a memory 54. The processor 53 is connected to a transceiver unit 55, which in turn is connected to the antenna 52. The memory 54 is configured to store necessary information for the processor 53 in order to communicate with other units, such as sets of communication parameters (CPs). Information regarding the master and temporary master in the subnet is preferably stored in the memory 54.

Optionally, the communication unit 50 is also provided with gateway functionality by providing a converter 56, configured to convert data received from a user terminal, e.g. a PC, through connector 57 to a suitable format before the processor may interpret the data. The connector 57 may be implemented with a wireless interface, but preferably it comprises a wired connection.

The advantage by combining gateway/node/master in the same communication unit is that it is cheaper to manufacture a single device, and the redundancy in the system is greater since the functionality of the communication unit may be decided by remote programming.

Figure 6:
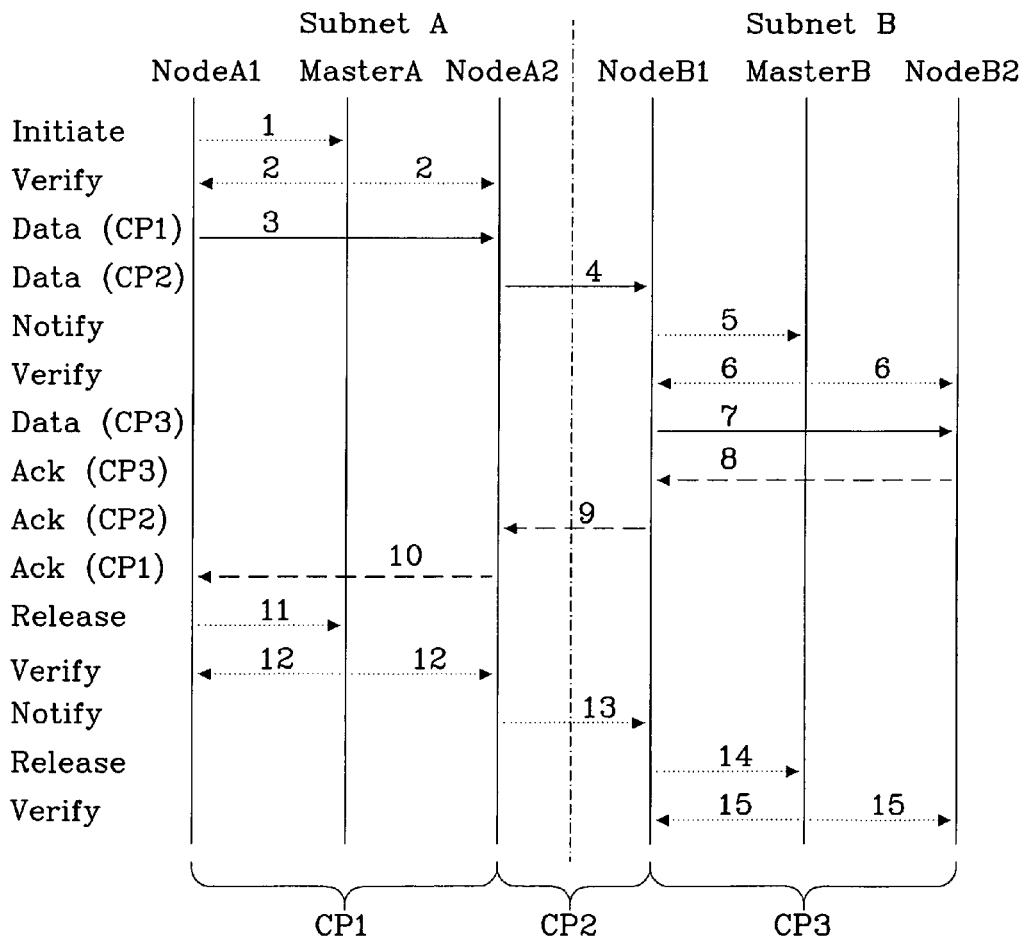
FIG. 6 shows a signal flow chart illustrating signalling when performing a transaction with acknowledgement between nodes belonging to different subnets.

FIG. 6 shows a signal flow chart illustrating an example of the process of performing a data transaction between a node in a subnet A to a node in a different subnet B. Subnet A is the initiating subnet and subnet B is the target subnet. In this example subnet A comprises a master (MasterA) and two nodes (NodeA1 and NodeA2), and subnet B comprises a master (MasterB) and two nodes (NodeB1 and NodeB2). NodeA1 wants to initiate a data transaction to NodeB2, and also wants to receive an acknowledgement that the data transaction was complete.

In FIG. 6, the dotted arrows indicate signaling, continuous arrows indicate data transactions, and dashed arrows indicate acknowledgements. All communication within a subnet is performed using local set of communication parameters (CP1 and CP3) and the communication between subnets uses a common set of communication parameters (CP2), as indicated at the bottom of FIG. 6.

1) NodeA1 sends a request to MasterA to initiate communication with NodeB1 in a neighboring subnet B.
2) MasterA sends a message to all nodes in subnet A verifying that NodeA1 is the "temporary master" in subnet A and thus has the ability to initiate data transaction within subnet A.
3) NodeA1 sends data to NodeA2, which represents any node in subnet A that may communicate with subnet B. It should be noted that all communication within subnet A is performed using a first local set of communication parameters (CP1), which is different from the communication parameters used by neighboring subnets.
4) In order to be able to transfer the data from subnet A to subnet B, NodeA2 needs to change the communication parameters to a common set of communication parameters CP2, shared by subnet A and subnet B, before sending the data from NodeA2 to NodeB1, which represents any node in subnet B that may communicate with subnet A.
5) NodeB1 notifies MasterB that data has been received from a neighboring subnet for transfer to NodeB2.
6) MasterB sends a message to all nodes in subnet B verifying that NodeB1 is the "temporary master" in subnet B and thus may initiate data transaction within subnet B.
7) NodeB1 sends data to NodeB2, which represents the final destination in subnet B. It should be noted that all communication within subnet B is performed using a second local set of communication parameters (CP3), which is different from the communication parameters used by neighboring subnets.
8) NodeB2 sends an acknowledgement message to the temporary master in subnet B, i.e. NodeB1 using the second local communication parameters CP3.
9) In order to be able to forward the acknowledgement message from subnet B to subnet A, NodeB1 needs to change the communication parameters to the common set of communication parameters CP2 before forwarding the acknowledgement message from NodeB1 to NodeA2 in subnet A.
10) In order to be able to forward the acknowledgement message to the temporary master in subnet A, i.e. NodeA1, NodeA2 needs to change the communication parameters to the first local set of communication parameters CP1 before forwarding the acknowledgement message to NodeA1.
11) When the acknowledgement message is received by NodeA1, the established communication channel between NodeA1 and NodeB2 is no longer needed. NodeA1 therefore sends a request to MasterA to release NodeA1 as temporary master in subnet A.
12) MasterA sends a message to all nodes in subnet A verifying that NodeA1 is no longer the temporary master in subnet A.
13) NodeA2 sends a message, using the common communication parameters CP2, to Node B1 to notify that the acknowledgement message was received and the communication channel is no longer needed.
14) When the notification is received by NodeB1 a request is sent to MasterB to release NodeB1 as temporary master in subnet B.
15) MasterB sends a message to all nodes in subnet B verifying that NodeB1 is no longer the temporary master in subnet B.

It is not always necessary to verify that a data transaction has reached its destination. A signal flow chart exemplifying this is presented in FIG. 7.

The denotations as presented in FIG. 6 for the subnets are used as well as the process for completing the data transaction, i.e. process steps 1-7.

16) When NodeA2 has completed its tasks to forward the data to NodeB1 in subnet B, it sends a request to MasterA to release NodeA1 as temporary master in subnet A.

17) MasterA sends a message to all nodes in subnet A verifying that NodeA1 is no longer the temporary master in subnet A.

18) When NodeB2 has received the data transaction from NodeB1, it sends a request to MasterB to release NodeB1 as temporary master in subnet B.

19) MasterB sends a message to all nodes in subnet B verifying that NodeB1 is no longer the temporary master in subnet B.

Figure 7:
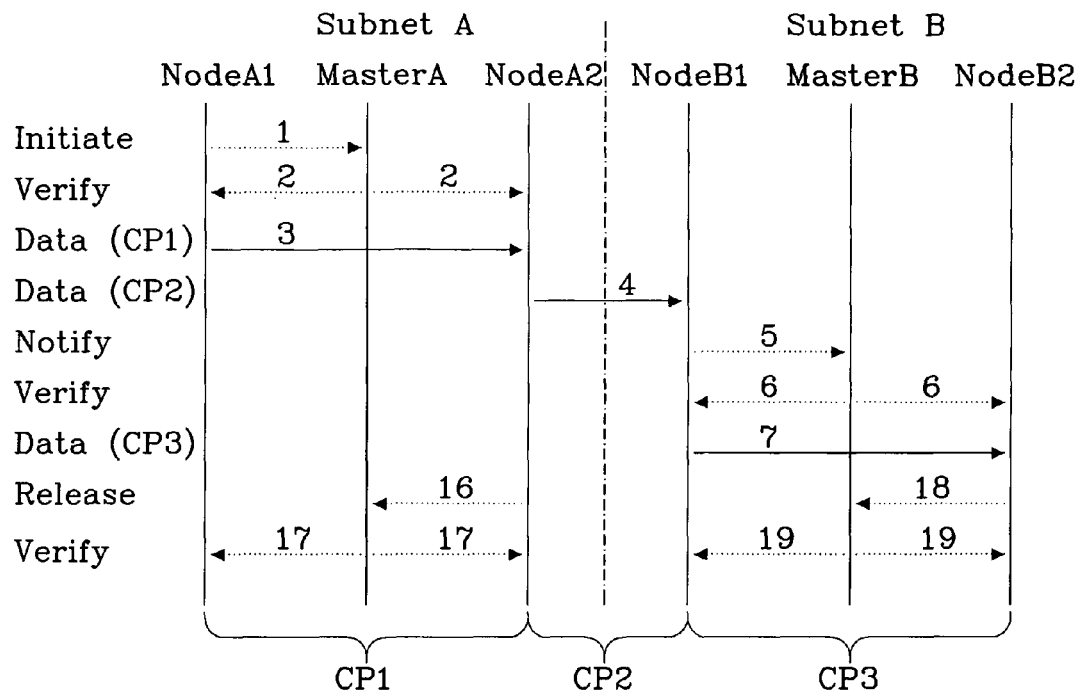
FIG. 7 shows a signal flow chart illustrating signalling when performing a transaction without acknowledgement between nodes belonging to different subnets.

Process steps 16 and 17 may be performed any time after the transfer in process step 4 has been completed, i.e. at the same time as process steps 18 and 19 are carried out, as indicated in FIG. 7.

Figure 8:
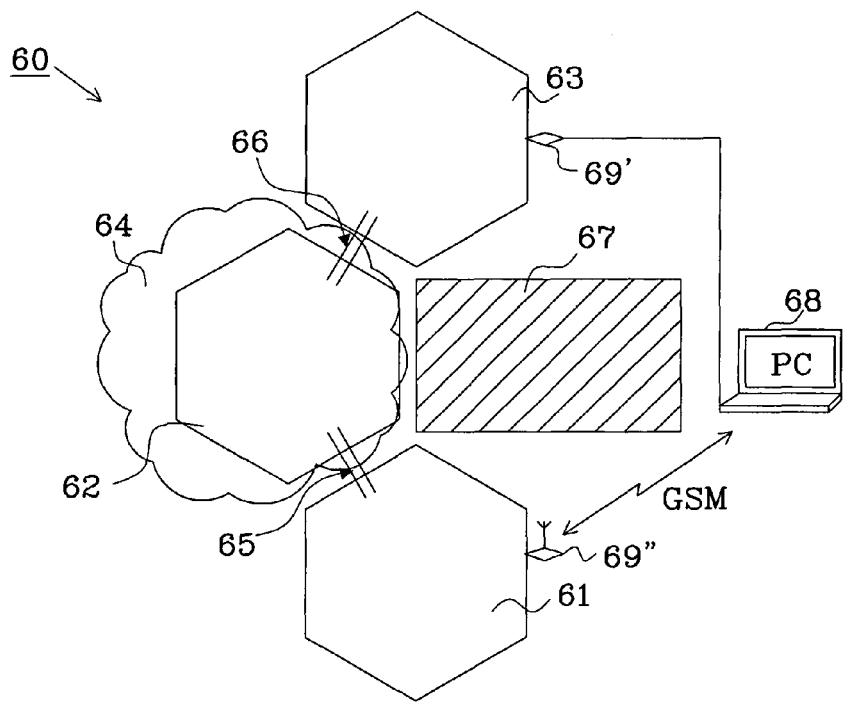
FIG. 8 shows a second embodiment of a wireless network adapted to local variations in the wireless environment.

FIG. 8 shows second embodiment of a wireless network 60 comprising three subnets 61, 62, 63 adapted to local variations in the wireless environment of each subnet.

Assume that two frequencies bands X and Y are available for communication in the area covered by the wireless network 60, and that a W-LAN 64, using frequency band X, change the wireless environment for subnet 62 compared to the wireless environment for subnet 61 and 63. Furthermore, subnet 61 and 63 are out of range from each other (e.g. blocked by a building 67) to be able to establish a direct communication channel there between, thus a communication channel needs to be established through subnet 62.

Communication parameters for subnet 62 is limited by the presence of the W-LAN 64 and in order to be able to communicate with the other subnets 61 and 63, a local set of communication parameters within subnet 62 that differs from local sets of communication parameters within subnets 61 and 63 needs to be selected. This may be achieved by using different frequency bands within the subnet for communication, for instance:

TABLE 1

| Subnet | Local CP |
|--------|----------|
| 61 | X |
| 62 | Y |
| 63 | X |

However, subnet 62 also needs to be able to communicate with subnets 61 and 63, and the only frequency range available for all subnets is frequency range Y. Thus, a mere division of available frequency ranges is not enough to fulfill the requirements to establish a wireless network according to the invention, i.e. a local set of communication parameters which is unique for each neighboring subnet and a common set of communication parameters for neighboring subnets. The use of different transport algorithms will solve the problem. For instance transport algorithm A1 and A2 may be used within frequency range Y.

Table 1 may be expanded to also include a common set of communication parameters:

TABLE 2

| Subnet | Wireless profile | Common CP | Local CP |
|--------|------------------|-----------|----------|
| 61 | X; Y(A2) | Y(A2) | X |
| 62 | Y(A1); Y(A2) | Y(A2) | Y(A1) |
| 63 | X; Y(A2) | Y(A2) | X |

Thus communication between subnet 61 and 62, indicated by reference numeral 65 is performed using the following communication parameters: frequency range Y in combination with transport algorithm A2, and the communication between subnet 62 and 63, indicated by reference numeral 66 is performed using the same communication parameters.

A set of communication parameters which is unique for each neighboring subnet may also be established, wherein each subnet 61 and 63 communicates using frequency range X, and subnet 62 communicates using frequency range Y in combination with transport algorithm A1.

If a new node is introduced within the area of the W-LAN 64 and within the distance of all subnets it will first start to determine the present wireless profile. In this example, the new node will detect the W-LAN and eventually the wireless environment will be identical to the one established within subnet 62. When this has been accomplished, the node will start to search for present subnets and eventually subnets 61, 62 and 63 will be found. The node now compares its wireless profile with the wireless profile of each subnet 61-63. As the wireless profile of the node matches the one established within subnet 62, it will join this subnet. A more detailed example of this process is described in connection with FIG. 9.

Communication within the wireless network can be said to be performed on real-time basis. However, a computer used to monitor, or control, the network operated by a user is an example of a non real-time application. The real-time wireless network and a non real-time application such as a PC 68 communicate through a gateway. Using gateways are common in computer communications networks and the present invention is not related to the gateway functionality per se. A gateway 69' in the described wireless network 60 may be used to decide which data transport algorithm should be used in the different subnets. Numerous mesh transport algorithms are commonly known, as mentioned below, and the gateway 69' is configured to decide which algorithm that is the best fit for a subnet 61, 62 or 63 and its environmental profile.

The gateway 69' may also be used when the wireless network is formed at start up and/or when a new subnet is formed during runtime. The primary gateway may also conduct self tests of the subnets to find out if there is any degradation/malfunctions of the nodes or master within a subnet.

One or more redundant gateways 69" may be used if the active gateway 69' malfunctions or is taken out of service. The redundant gateways 69" are not active but will keep the current list of network parameters which is used by the active gateway 69'. The active gateway 69' is called primary gateway, and if the active gateway is taken out of service a redundant gateway 69" will take its place in the network. Every redundant gateway 69" will listen to the transmissions of the active gateway 69' and will activate automatically upon timeout of following a predetermined prioritized order if there is more than one redundant gateway.

The active gateway 69' and the redundant gateway 69" may communicate with the PC 68 through a wired connection, as indicated by the solid line between the gateway 69' and the PC 68, or wirelessly using a standard protocol, such as provided in GSM, as indicated by the bidirectional arrow between the redundant gateway 69" and the PC 68.

Figure 10:
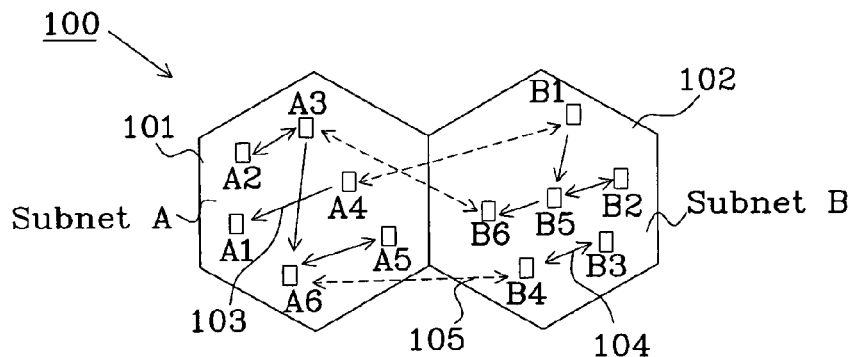
FIG. 10 shows a third embodiment of a wireless network according to the present invention.

FIG. 10 shows a third embodiment of a wireless network 100 comprising subnet A 101, and subnet B 102. Subnet A 101 has six nodes A1-A6 sharing a local set of communication parameters $CP_A$ and subnet B 102 also has six nodes B1-B6 sharing a second local set of communication parameters $CP_B$. It should be noted that the neighboring subnets have unique local sets of communication parameters, i.e. CPA is different from $CP_B$ to prevent interferences between neighboring subnets. The nodes in the neighboring subnets also share a common set of communication parameters $CP_Q$, which is different from the local sets of communication parameters, i.e. $CP_{AB} \neq CP_A \neq CP_B$.

A master node, such as A1 and B1 is preferably present in each subnet, and the function of the master is described in more detail in connection with FIG. 9.

In FIG. 10, a number of communication paths are shown, in which solid lines 103, 104 indicate internal communication between nodes within a subnet; and dashed lines 105 indicate communication between nodes belonging to different subnets. Also, note that communication between the subnets 101, 102 may be performed without the need to use the master of each subnet to transfer information between subnets, any node can perform this function as described in connection with FIGS. 11 and 12.

Figure 11:
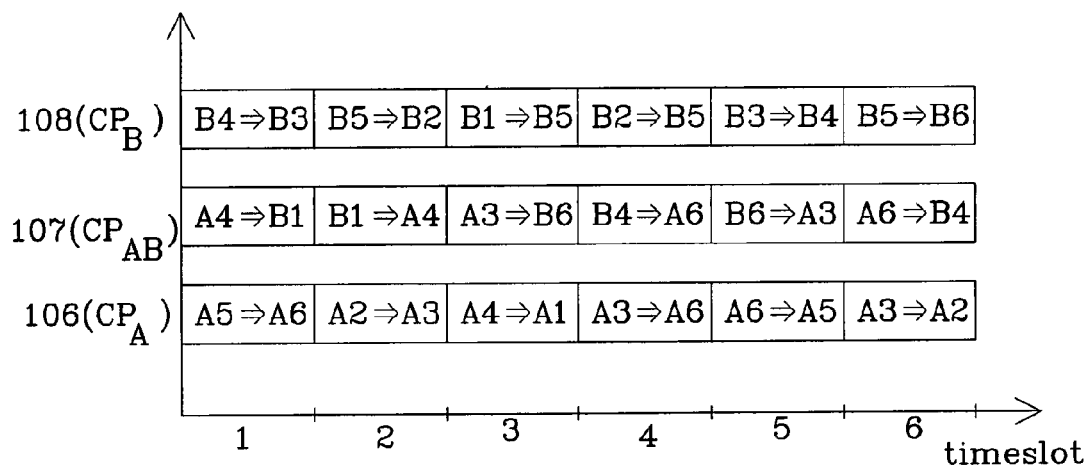
FIG. 11 illustrates simultaneous communication using non-overlapping frequency channels as communication parameters within and between neighboring subnets.

In FIG. 11, three frequency channels have been used to illustrate different communication parameters. $CP_A$ corresponds to a first frequency channel 106, $CP_{AB}$ corresponds to a second frequency channel 107 and $CP_B$ corresponds to a third frequency channel 108.

Each frequency channel is divided into timeslots 1-6, and in the first time slot communication is simultaneously performed from A5 to A6, from A4 to B1 and from B4 to B3. In second timeslots 2-6, similar communications is performed simultaneously over the three non-overlapping frequency channels representing the different communication parameters used for communication.

Figure 12:
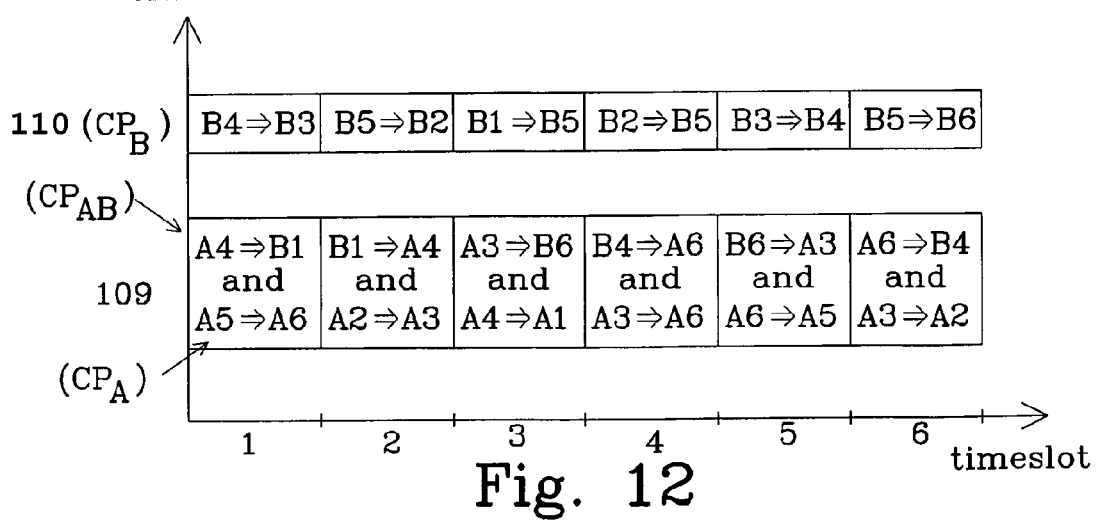
FIG. 12 illustrates simultaneous communication using overlapping frequency channels with different transport algorithms as communication parameters within a subnet and between neighboring subnets.

Other types of communication parameters may naturally be used to obtain the same purpose, such as using overlapping frequency channels using different types of transport algorithms, as illustrated in FIG. 12. Here, a common frequency channel 109 is used for internal communication within subnet A using a first transport algorithm and between different subnets using a second transport algorithm. A second frequency channel 110 is used for internal communication within subnet B.

Forming a Wireless Network

A wireless network may be formed using a predetermined procedure, wherein three preferred methods are described below.

A) Top-to-Bottom Approach
1. The gateway will perform an identification of the network using for example a binary tree search, as is obvious for a skilled person
2. The nodes report its environmental profile.
3. The gateway sets up the subnets and the master within each subnet.

B) Bottom-to-Top Approach
1. When a node is powered for the first time it investigates and establishes its own environmental profile.
2. Then the node attempts to detect neighbouring subnets and their respective master and compare the environmental profiles of the neighbouring subnets with the established environmental profile of the node.
3. If no subnets or masters are detected the node will become a master and try to find new nodes or other subnets.
4. Eventually a path to the gateway will be established as more new nodes are joined to the wireless network.

C) Predefined Masters
1. On forehand some units will be predefined as masters.
2. When such a unit is powered it will try to find neighbouring nodes and join them to its subnet.
3. Next step will be to find a route to the gateway.

Figure 9:
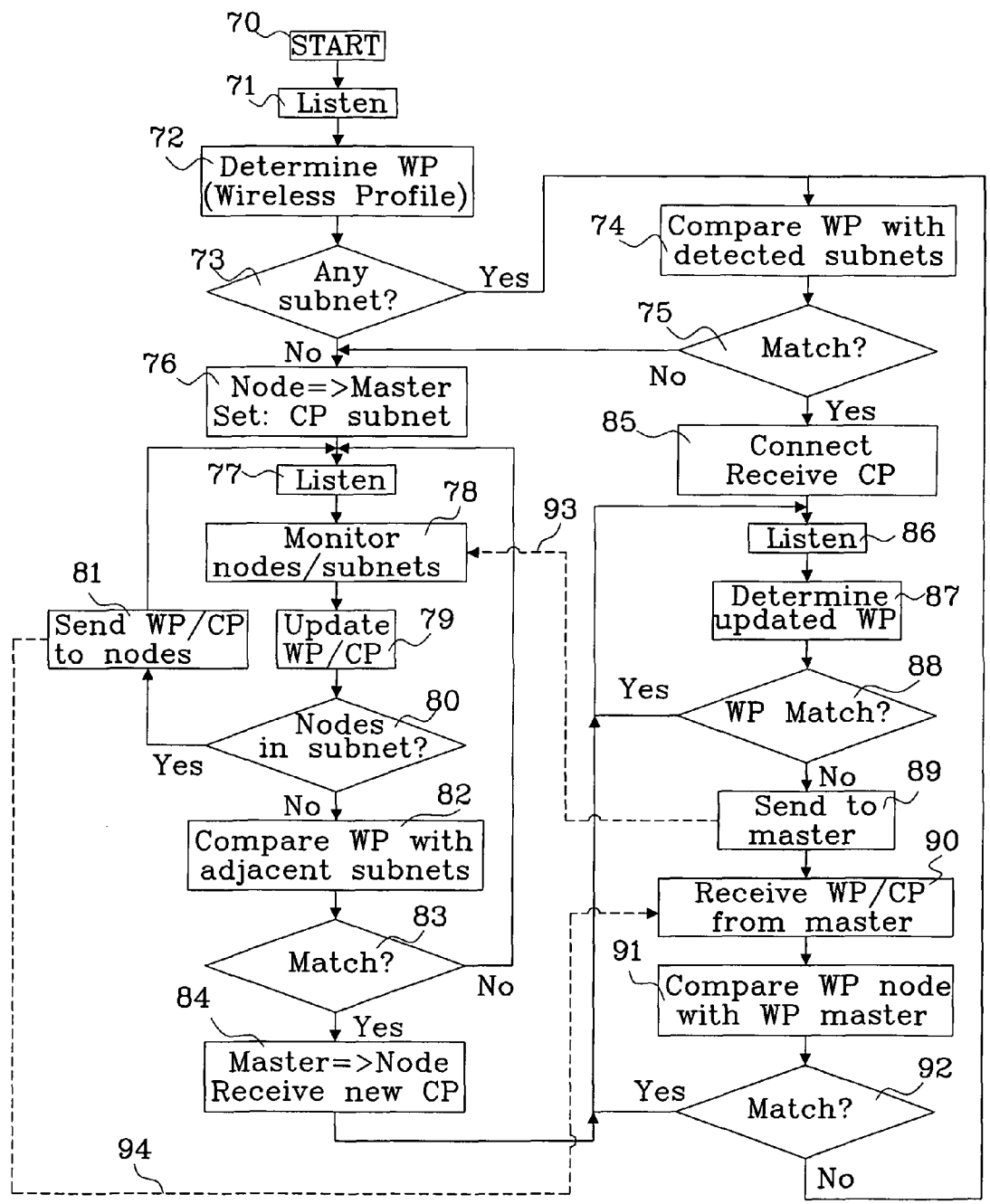
FIG. 9 shows a flow chart illustrating a preferred embodiment of the procedure to form a wireless network that adapts to local wireless environment.

FIG. 9 shows a flow chart illustrating a preferred embodiment (as briefly described in the "Bottom-to-top approach" above) of the procedure to form a wireless network that adapts to local variations in wireless environment.

Steps 70-75 describes the introduction of a communication unit that is not yet part of any subnet (as master or node). Steps 76-83 describes the actions taken by the communication unit when acting as a master in a subnet, and steps 84-92 describes the actions taken by the communication unit when acting as a node connected to a master in a subnet.

When a communication unit is started for the first time, step 70, it collects information regarding the wireless environment by listening, as indicated in step 71. A wireless profile WP for the communication unit is thereafter determined based on the wireless environment in step 72 and if the communication unit is able to detect a subnet being part of the same wireless network, step 73, the flow continues to step 74 to compare the WP of the communication unit with the WP of the detected subnets, and thus accessible subnets. However, if no subnets are detected in step 73, the flow continues to step 76 in which the communication unit is upgraded to a master in a new subnet and a set of communication parameters are set for the new subnet based on the WP determined in step 72. If a match is not found when comparing WP of the communication unit with the WP of detected subnets in step 74, a decision is made in step 75 to continue to step 76, and if a match is found the flow continues to step 85 in which the communication unit is assigned to be a node in the matching subnet.

In step 77, the master listens to determine any changes to its wireless environment. The master also monitors the WP of nodes within the subnet (as indicated by the dashed line 93), and the WP of other subnets within its range, step 78. The purpose is to receive information to update the local set of communication parameters used within the subnet and to update the common set of communication parameters used to communicate with other subnets within its range without interfering in other wireless applications. The WP of the master and the set of communication parameters CP (local and common) are updated in step 79.

As soon as a new subnet is formed with a master, as described in step 76, nodes connected to other subnets and newly started communication units may connect to the new subnet continuously. If there are any nodes connected to the subnet, step 80, the flow is fed back to step 77 via step 81, in which the current WP of the master and CP are transmitted to the connected nodes (as indicated by the dashed line 94). However, if no nodes are connected to the subnet, and thus the master is the only communication unit present in the subnet, the flow continues to step 82. The WP of the master is compared with the WP of subnets within its range, i.e. probably adjacent subnets. If a match is not found when comparing the WPs in step 82, a decision is made in step 83 to proceed to step 77. However, if a match is found, the master is degraded to node and connected to the matching subnet. A new set of communication parameters (local and common) is received in step 84 before the flow continues to step 86.

When the communication unit is assigned to be a node in the matching subnet in step 85, the node is connected to the master in the matching network and CP (local and common) is received before the flow continues to step 86.

In step 86, the node listens to determine any changes to its wireless environment, and the WP of the node is updated in response to detected changes, step 87. If the changes in the updated WP are significant, a decision is made in step 88 and the flow continues to step 89. However, if the changes are insignificant, the flow is fed back to step 86.

In step 89, the updated WP of the node is transmitted to the master, as indicated by the dashed line 93, to be received by the master during the monitoring step 78. The flow thereafter continues to step 90 in which the current WP of the master and CP (local and common) are received from the master, as indicated by the dashed line 94. A comparison between the WP of the node and the WP of the master is performed in step 91 and if the WP of the node matches the WP of the master, a decision is made in step 92 and the flow is fed back to step 86. However, if a match is not found in step 92, the flow is fed back to step 74 where the WP of the node is compared with detected subnets.

Local Communication Parameters

Available frequencies on a subnet level needs to be used effectively, and in order to achieve this goal a process called "dynamic channel density adaptation" is introduced. Dynamic channel density adaptation will greatly increase the coexistence performance compared to prior art methods. This process will always make use of all available frequencies. A frequency unoccupied by other wireless networks will be used at a 100% rate. A frequency used 50% of the time by other wireless networks will only be used 50% of the time. A frequency used 95-100% of the time will be used 5% of the time. The reason to always use a frequency even though it is occupied 100% of the time is to monitor changes in the usage rate.

Typically, the usage rate of frequencies in wireless communication, which is equal to data transaction density, will vary over time. In a residential area Wi-Fi usage will have its peak during evenings but will be less used during office times. The natural cause of this is increased need to access the Internet when people are at home. Thus, it is obvious that less use of the Wi-Fi frequencies by the subnet in the evenings will greatly increase the coexistence performance. Furthermore, as all frequencies are always used to some extent, the system will swiftly adapt and increase the use of frequencies when they are less occupied.

When communication units within a subnet starts communicating for the first time every master and node will use every available frequency just as much. Even though data is not transferred, the master and its nodes in the subnet will jump to a new frequency for every new timeslot. Instead of using the channel to communicate, every node and master will listen to find other wireless networks using that particular frequency at that particular timeslot. If the master or any of the nodes detects that the frequency is in use it will record this and store it in the master. The master will thereafter communicate any changes to the nodes in order to update the wireless profile of the subnet.

When a data transaction takes place between the master and one or many nodes, every node will record if the data transaction is not successful, which will be the case when a transmission of another wireless system uses the same frequency and thus blocks the frequency.

The nodes in a subnet, not being target for communication from the master to any nodes in the same subnet will not record this communication as another wireless network occupying the frequency as it will be identified as wireless communication within the subnet.

Every node will periodically report the channel density to the master which will take active action and calculate subnet channel density e.g. using the formula:

$$X+Y=1$$

$$UR=|X^*(1-t\_occ\_n/t\_meas\_n)^*(1-10^{((P\_i-P\_TX)/10)}+Y^*(1-PERn)|$$

UR=usage rate of the frequency in %
t_meas_n=measurement period on frequency n
t_occ_n=time a frequency n is occupied
PERn=packet error rate at frequency n
P_i=average power level from a interfering wireless network
P_TX=carrier power of transmitter
X=weight of parameter in %
Y=weight of parameter in %

In this example communication parameters time, frequency, RF-power has been used further packet error rate have been used to find the usage rate in % of a frequency.

If no interference is detected the left hand expression $$X^*(1-t\_occ\_n/t\_meas\_n)^*(1-10^{((P\_i-P\_TX)/10)})$$
equals $X^*1$ If the packet error rate is 0% the right hand expression $$Y^*(1-PERn) \text{ equals } Y^*1$$

As X+Y=1 thus UR=|X*1+Y*1|=100% usage rate of frequency n in this example which is the natural case when no other wireless system is detected and every data packet reaches it's destination.

Example of mesh transport algorithms:
AODV (Ad hoc On-Demand Distance Vector)
OLSR (Optimized Link State Routing protocol)
DSR (Dynamic Source Routing)
OSPF (Open Shortest Path First Routing)
DSDV (Destination-Sequenced Distance-Vector Routing)
B.A.T.M.A.N. (Better Approach To Mobile Adhoc Networking)
PWRP (Predictive Wireless Routing Protocol)
OORP (OrderOne Routing Protocol) (OrderOne Networks Routing Protocol)
TORA (Temporally-Ordered Routing Algorithm)
HSLS (Hazy-Sighted Link State)
IWMP (Infrastructional Wireless Mesh Protocol) for Infrastructred Mesh Networks by UFPB-Brazil Examples of license free frequency bands which may be used globally are:
2.480-2.4835 GHz
5.15-5.25 GHz
5.25-5.35 GHz
5.725-5.825 GHz In the above described examples, all communication between units within each subnet and between units situated in neighboring subnets is performed using the same communication platform. A communication platform is in this specification defined as a communication platform that shares the identical plural sets of communication parameters. Communication can be performed using all sets of communication parameters or a subset of those.

A subnet communicating over GSM and a subnet communicating over ZigBee will not share any sets of communication parameters, and even if some set of communication parameters is shared (e.g. for a subnet communicating over WiFi 802.11b and a subnet communicating over ZigBee) neither subnet can use all of the other subnet's entire sets of communication parameters. Communication in both these examples will not be possible if one of the subnets uses a set of communication parameters which cannot be used by the other subnet.

However, if exactly the same sets of communication parameters can be used by the two subnets, i.e. they share the same communication platform, and then communication will always be possible between those as long as the exact same set of communication parameters are selected during communication.

REFERENCES

[1] "Cluster-based multi-channel scheduling algorithms for ad hoc networks", by Hyukjin Lee and Cheng-Chew Lim, *Wireless and Optical Communications Networks, 2007. WOCN '07. IFIP International Conference on*, pages 1-5, 2-4 Jul. 2007.

[2] "CogMesh: A Cluster-based Cognitive Radio Network", by Tao Chen, Honggang Zhang, Gian Mario Maggio, and Imrich Chlamtac, *New Frontiers in Dynamic Spectrum Access Networks, 2007. DySPAN 2007, 2nd IEEE International Symposium on*, pages 168-178, 17-20 Apr. 2007.

The invention claimed is:

1. A wireless network comprising:
   at least two subnets, each subnet including a plurality of units configured to wirelessly communicate with each other; and
   the wireless network being configured to select a local set of communication parameters for internal communication within each subnet;
   wherein the wireless network is further configured to
      select the local set of communication parameters for neighboring subnets to be unique, such that internal communication within neighboring subnets is performed by different local sets of communication parameters to prevent interference between neighboring subnets, and
      select at least one common set of communication parameters that is different than the local sets of communication parameters, for neighboring subnets within the wireless network, such that communication between neighboring subnets in the wireless network may be performed simultaneously with internal communication within each subnet;
   wherein one of the plurality of units in each subnet is a master configured to select the local set of communication parameters and the common set of communication parameters for each subnet;
   wherein the wireless network is further configured to base the selection of the local set of communication parameters and the common set of communication parameters on a wireless environment for each subnet; and
   wherein the master is configured to establish a wireless profile WP of the wireless environment, and to select the local set of communication parameters and the common set of communication parameters for each subnet based on the established wireless profile WP.

2. The wireless network according to claim 1, wherein at least one node is configured to function as a gateway, which is adapted to communicate with an externally arranged computer.

3. The wireless network according to claim 1, wherein the local set of communication parameters and the common set of communication parameters for each subnet are used in the same communication platform.

4. A method for adapting a wireless network including at least two subnets, each subnet having a plurality of units configured to wirelessly communicate with each other using a local set of communication parameters, the method comprising:
   a) selecting the local set of communication parameters for neighboring subnets to be unique, such that internal communication within neighboring subnets is performed by different local sets of communication parameters to prevent interference between neighboring subnets; and
   b) selecting at least one common set of communication parameters that is different than the local sets of communication parameters, for neighboring subnets within the wireless network, such that communication between neighboring subnets in the wireless network may be performed simultaneously with internal communication within each subnet;
   wherein the wireless network is configured to adapt to a wireless environment, and the method further involves,
   determining a wireless profile WP for each subnet by listening to the wireless environment within each subnet before performing steps a) and b);
   modifying step a) to include selecting the local set of communication parameters for each subnet based on the determined wireless profile WP;
   modifying step b) to include selecting the at least one common set of communication parameters based on the determined wireless profile WP; and
   regularly repeating the step of determining the wireless profile WP and thereafter adapting the local set of communication parameters and the common set of communication parameters to changes in the wireless environment.

5. The method according to claim 4, wherein the wireless profile WP, determined before step a, is adapted based on dynamic channel density.

6. A unit configured to be used in a wireless network that includes
   at least two subnets, each subnet including a plurality of units configured to wirelessly communicate with each other; and
   the wireless network being configured to select a local set of communication parameters for internal communication within each subnet;
   wherein the wireless network is further configured to
      select the local set of communication parameters for neighboring subnets to be unique, such that internal communication within neighboring subnets is performed by different local sets of communication parameters to prevent interference between neighboring subnets, and
      select at least one common set of communication parameters that is different than the local sets of communication parameters, for neighboring subnets within the wireless network, such that communication between neighboring subnets in the wireless network may be performed simultaneously with internal communication within each subnet;
   wherein one of the plurality of units in each subnet is a master configured to select the local set of communication parameters and the common set of communication parameters for each subnet;
   wherein the wireless network is further configured to base the selection of the local set of communication parameters and the common set of communication parameters on a wireless environment for each subnet; and
   wherein the master is configured to establish a wireless profile WP of the wireless environment, and to select the local set of communication parameters and the common set of communication parameters for each subnet based on the established wireless profile WP.

* * * * *